US011270303B2

United States Patent
Mandal et al.

(10) Patent No.: US 11,270,303 B2
(45) Date of Patent: Mar. 8, 2022

(54) CRYPTOCURRENCY-BASED EVENT PARTICIPATION VERIFICATION

(71) Applicant: FUJITSU LIMITED, Kawasaki (JP)

(72) Inventors: Avradip Mandal, San Jose, CA (US); Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 656 days.

(21) Appl. No.: 15/161,001

(22) Filed: May 20, 2016

(65) Prior Publication Data

US 2017/0337552 A1 Nov. 23, 2017

(51) Int. Cl.
*G06Q 20/40* (2012.01)
*G06Q 20/38* (2012.01)
*G06Q 20/06* (2012.01)
*G06Q 20/10* (2012.01)
*H04L 9/08* (2006.01)
(Continued)

(52) U.S. Cl.
CPC ......... *G06Q 20/401* (2013.01); *G06Q 20/047* (2020.05); *G06Q 20/065* (2013.01); *G06Q 20/10* (2013.01); *G06Q 20/367* (2013.01); *G06Q 20/3821* (2013.01); *G06Q 20/3829* (2013.01); *G06Q 30/0207* (2013.01); *H04L 9/0825* (2013.01); *H04L 9/3239* (2013.01); *H04L 2209/38* (2013.01)

(58) Field of Classification Search
USPC .................................................... 705/50–79
See application file for complete search history.

(56) References Cited

U.S. PATENT DOCUMENTS 5,666,416 A * 9/1997 Micali .................... G06Q 20/02
380/286
8,028,896 B2 * 10/2011 Carter ................ G06Q 10/0633
235/379
(Continued)

OTHER PUBLICATIONS

"AIA-MN", (downloaded from http://www.aia-mn.org/wp-content/uploads/AIA-MN-2015-Convention-Prospectus-form.pdf; attached as a PDF file (Year: 2015).*
(Continued)

*Primary Examiner* — James D Nigh
*Assistant Examiner* — Margaret M Neubig
(74) *Attorney, Agent, or Firm* — Maschoff Brennan

(57) ABSTRACT

A method of participation verification includes generating sets of cryptocurrency coins (coin sets). The coin sets have cryptocurrency coins and correlate to events for which participation is verified. The method includes generating user keys including unique public keys for each user and user secret keys. The method includes assigning a public key to a user, communicating the assigned public key to a user device and enabling download of a verification application. The method includes receiving a first coin request that includes identification of a first coin set, the assigned public key, and a data set. The method includes verifying user participation in an event based on the data set. The method includes executing a cryptocurrency transaction with the user device. The cryptocurrency transaction including public validation of a transfer of a cryptocurrency coin from the identified coin set to the user device via an append-only ledger.

14 Claims, 8 Drawing Sheets

(51) Int. Cl.
*G06Q 20/36* (2012.01)
*H04L 9/32* (2006.01)
*G06Q 30/02* (2012.01)
*G06Q 20/04* (2012.01)

(56) References Cited

U.S. PATENT DOCUMENTS

| | | | | |
|---|---|---|---|---|
| 8,046,256 B2* | 10/2011 | Chien | | G06Q 30/0267 |
| | | | | 705/14.33 |
| 2004/0193489 A1* | 9/2004 | Boyd | | G06Q 30/0225 |
| | | | | 713/176 |
| 2010/0318692 A1* | 12/2010 | Koll | | G06F 3/0647 |
| | | | | 710/38 |
| 2014/0074569 A1* | 3/2014 | Francis | | G06Q 20/321 |
| | | | | 705/14.3 |
| 2014/0351593 A1* | 11/2014 | Anson | | H04L 63/0442 |
| | | | | 713/168 |
| 2015/0235255 A1 | 8/2015 | Desai et al. | | |
| 2015/0262176 A1* | 9/2015 | Langschaedel | | G06Q 20/0658 |
| | | | | 705/71 |
| 2015/0324764 A1* | 11/2015 | Van Rooyen | | G06Q 20/02 |
| | | | | 705/69 |
| 2015/0363773 A1 | 12/2015 | Ronca et al. | | |
| 2015/0371224 A1 | 12/2015 | Lingappa | | |
| 2016/0012424 A1* | 1/2016 | Simon | | G06Q 20/3674 |
| | | | | 705/67 |
| 2017/0140408 A1* | 5/2017 | Wuehler | | G06Q 30/0207 |

OTHER PUBLICATIONS

"AIA-MN", (downloaded from http://www.aia-mn.org/wp-content/uploads/AIA-MN-2015-Convention-Prospectus-form.pdf, attached as PDF file (Year: 2015).*

"AIA-MN", (downloaded from http://www.aia-mn.org/wp-content/uploads/AIA-MN-2015-Convention-Prospectus-form.pdf and previously attached as a PDF file), (Year: 2015).* https://en.bitcoin.it/wiki/How_bitcoin_works PDF attached; wayback for 2016 taken (Year: 2016).*

"AIA-MN", (downloaded from http://www.aia-mn.org/wp-content/uploads/AIA-MN-2015-Convention-Prospectus-form.pdf; attached as a PDF file with first action). (Year: 2015).*

NPL, "Cryptocurrency and Bitcoin: A possible foundation of future currency," downloaded from https://skemman.is/bitstream/1946/20840/1/BS%20Ritger%C3%B0%20-%20Cryptocurrency%20-%20Sindri%20Le%C3%B3%20%C3%81rnason%20Final.pdf and attached as PDF file. (Year: 2015).*

European Search Report dated Aug. 8, 2017 in application No. 17153843.2.

Meni Rosenfeld, et al. (Dec. 4, 2012). "Overview of Colored Coins". Retrieved from https://bitcoil.co.il/BitcoinX.pdf.

Nishanth, Chandran et al., "Position-based cryptography," Department of Computer Science, UCLA, Aug. 16, 2009.

Luo, Wanying and Urs Hengartner, "VeriPlace: A Privacy-Aware Location Proof Architecture," ACM GIS, Nov. 2, 2010.

Z Cash, retrieved on May 18, 2016, retreived from <https://z.cash/>.

Bitcoinwiki, "Colored Coins," retrieved on May 18, 2016, retrieved from <https://en.bitcoin.it/wiki/Colored_Coins>.

Bitcoinwiki, Help:Introduction, retrieved on May 18, 2016, retrieved from <https://en.bitcoin.it/wiki/Help:Introduction>.

* cited by examiner

CRYPTOCURRENCY-BASED EVENT PARTICIPATION VERIFICATION

FIELD

The embodiments discussed herein are related to cryptocurrency-based event participation verification.

BACKGROUND

A cryptocurrency is a digital exchange medium that uses cryptography to secure and conduct transactions between entities. Some examples of cryptocurrencies include BITCOIN® and COLORED COINS. In some cryptocurrency systems, a decentralized system of transaction authentication is used. For example, in Bitcoin, a block chain, which is a type of append-only ledger, is used to publically post a transaction for miners to authenticate. The block chain logs every transaction in sequence, which allows the miners to authenticate each transaction involving Bitcoin.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of secure event participation verification may include generating a first number of sets of cryptocurrency coins (coin sets). Each of the coin sets may have a second number of cryptocurrency coins. Additionally, each of the coin sets may be correlated to one event in a set of events for which participation is to be verified. In response to a user of the set of users requesting inclusion in a verification service, the method may include generating a user key pair that includes a unique public key for the user and user secret key, assigning the unique public keys to the user and to a user device that is associated with the user, communicating the assigned unique public key to the user device, preventing access to the user secret key paired with the assigned unique public key, and enabling download of a verification application to the user device. The set of users may include the second number of users. The method may include receiving from the verification application of the user device, a first coin request. The first coin request including an identification of a first coin set of the coin sets, the unique public key that is assigned to the user, and a first data set that is configured to prove participation by the user in a first event that correlates to the first coin set. The method may include verifying that the user participated in the first event based on the first data set. In response to verification of participation in the first event by the user, the method may include executing a cryptocurrency transaction with the user device. The cryptocurrency transaction including public validation of transfer of a cryptocurrency coin from the identified first coin set to the user device via an append-only ledger.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1:
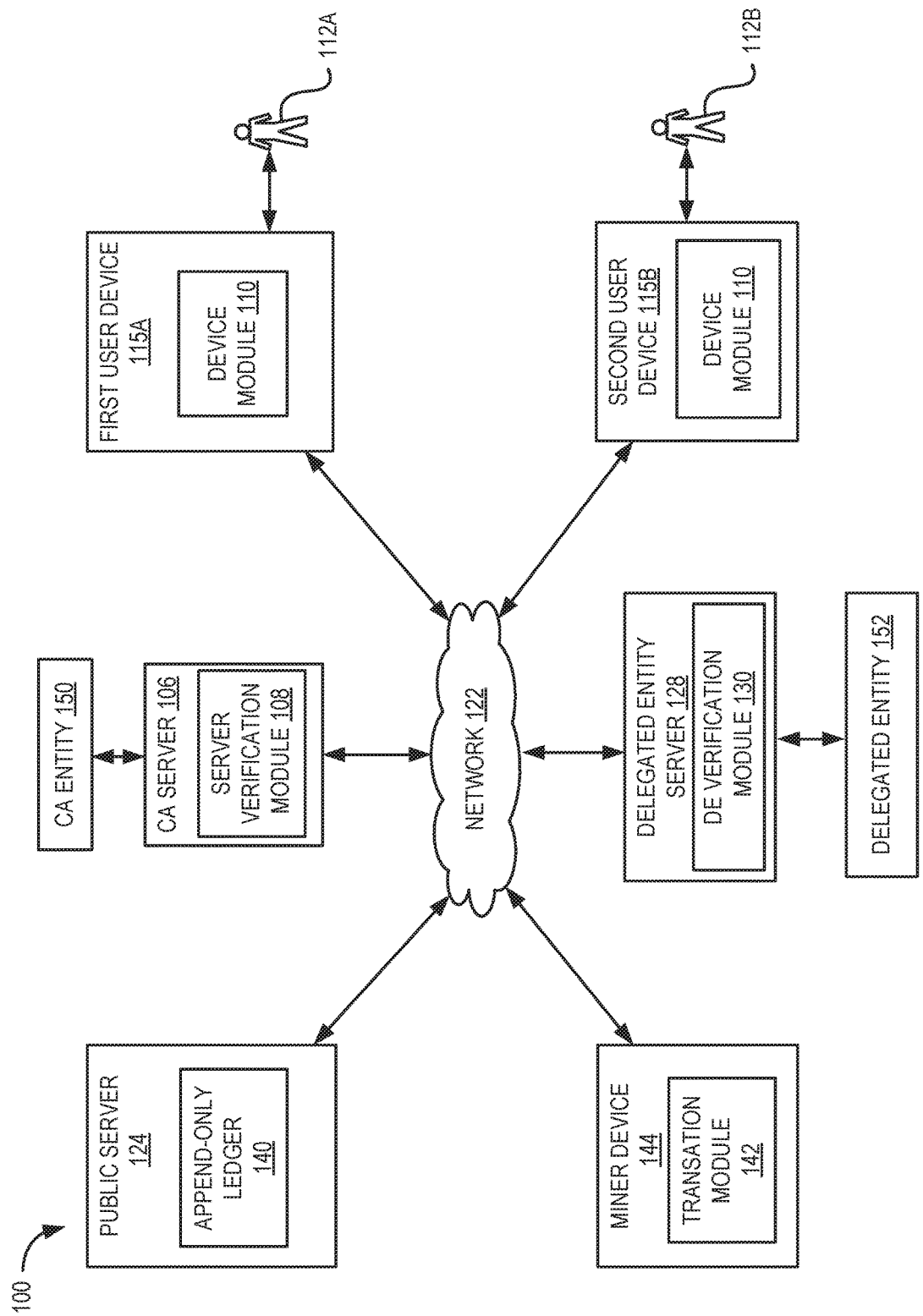
FIG. 1 is a block diagram of an example operating environment in which some embodiments described herein may be implemented.

A central authority such as a business entity or a governmental entity may want to reward users for participating in a set or series of events. For example, a business entity may reward users for visiting a set of different locations or for collection of a set of coupons. The central authority may want to enable the users to securely prove that they have participated in the events while making it difficult for the users to claim to have participated when they actually have not.

Accordingly, embodiments described in this disclosure use cryptocurrency and a verification application to enable the users to securely prove that they have participated in the events. In some embodiments, the central authority generates or receives cryptocurrency in quantities that are related to the number of users and the number of events. For example, the central authority may generate sets of cryptocurrency coins (coin sets). The number of coin sets may be equal to the number of events and each of the coin sets may correlate to one of the events. The number of coins in each of the coin sets may be equal to a number of users.

During an initial interaction between the central authority and the user, the user may download the verification application. Additionally, the central authority may assign a public key to the user, which may be communicated to the user. As the user participates in the events, the user communicates coin requests to the central authority. The coin requests may specify the event in which the user is participating through identification of the coin set correlated to the event. The coin request may also include a data set that substantiates or proves that the user actually participated in the event.

The central authority verifies that the user actually participated in the event based on the data set. Using a cryptocurrency transaction, the central authority transfers one of the cryptocurrency coins from the identified coin set to the user. A similar process occurs for each coin request based on each event in which the user is participating. The cryptocurrency transactions may be executed using an append-only ledger and public validation.

After the user has collected a cryptocurrency coin from each of the coin sets, the central authority may verify such through review of the append-only ledger. The central authority may reward the user for participation in the events.

Because the central authority owns each of the coin sets and the user does not have access to the secret keys, the cryptocurrency transactions involving the coin sets are limited. For example, the central authority may only transfer the cryptocurrency coins to the users and not vice versa. Additionally, use of the append-only ledger enables public review and a transaction history. In some embodiments, the central authority may use the COLORED COIN portion of the BITCOIN® system or a similar cryptocurrency system. These and other embodiments are described with reference to the appended figures in which similar item numbers indicate a similar structure unless otherwise specified.

FIG. 1 is a block diagram of an example operating environment 100 in which secure event participation verification (hereinafter, "participation verification") may be performed. The participation verification may enable a central authority server (CA server) 106 to verify that one or more users 112A and 112B (generally, user 112 or users 112) have participated in a set of events. The participation verification may be based on the CA server 106 or a delegated entity server (DE server) 128 transferring one or more cryptocurrency coins to the users 112 in exchange for the users 112 substantiating their participation in one or more events of the set of events. The CA server 106 may then verify that the user 112 has participated in each event in a set of events by verifying a set of cryptocurrency transactions. In exchange for the users 112 participating in the set of events, the users 112 may receive a reward from a central authority entity (CA entity) 150 associated with the CA server 106 and/or a delegated entity 152 associated with the delegated entity server 128.

In some embodiments, the operating environment 100 may implement cryptocurrency coins or one or more other similar cryptocurrencies. The cryptocurrency coins may have little or no monetary value other than use in the participation verification. For example, COLORED COINS, which are implemented in BITCOIN® infrastructures or a similar cryptocurrency, may be used in the operating environment 100. Cryptocurrency transactions involving the COLORED COINS may be authenticated by a miner device 144 using an append-only ledger 140, which may be referred to as a block chain. Some additional details of the COLORED COINS and the block chain are described in en.bitcoin.it/wiki/Help:Introduction and en.bitcoin.it/wiki/Colored_Coins, which are incorporated by reference in their entireties.

Use of the cryptocurrency may enable the participation verification in the operating environment 100 that is secure and sound. For example, the participation verification may be configured such that the users 112 may prove participation by the user 112 and/or user devices 115A and 115B (generally, user device 115 or user devices 115) associated with the user 112 while preventing or substantially preventing cheating (e.g., attempting to substantiate participation without participation in the event) by the users 112. Moreover, the participation verification may be configured to ensure that only the one or more users 112 who actually participated in the set of events are capable of proving to the CA server 106 and/or the delegated entity server 128.

The operating environment 100 of FIG. 1 may include the CA server 106, the user devices 115, the users 112, the delegated entity server 128, the delegated entity 152, the miner device 144, and a public server 124. The CA server 106, the user devices 115, the users 112, the delegated entity server 128, the delegated entity 152, the miner device 144, and the public server 124 are collectively referred to as "environment components." The environment components may be configured to communicate data and information via a network 122. Each of the environment components and the network 122 are described below.

The network 122 may include wired or wireless configurations, and may have configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 122 may enable communication via a standard-based protocol such as smart energy profile (SEP), Echonet Lite, OpenADR, or another suitable protocol (e.g., Wi-Fi, ZigBee, etc.).

The miner device 144 may include any computing system that includes a processor, memory, and computing capabilities. In the illustrated embodiments, the miner device 144 may be coupled to the network 122 to send and receive information with one or more of the environment components via the network 122. For example, the miner device 144 may be configured to receive information related to the users 112, the CA server 106, the delegated entity server 128, or some combinations thereof that are used in cryptocurrency transactions.

In some embodiments, the data and information received by the miner device 144 may include public keys assigned to the users 112 and/or the user devices 115. Additionally, the data and information received by the miner device 144 may include secret keys that may correlate to a particular cryptocurrency coin. Additionally still, the data and information received by the miner device 144 may include a number and/or a type of cryptocurrency coins included in a cryptocurrency transaction.

The miner device 144 may include a transaction module 142. The transaction module 142 may be configured to validate the cryptocurrency transaction. In particular, the cryptocurrency transaction may include public validation of transfer of a cryptocurrency coin from the identified first coin set to the user device 115 via an append-only ledger.

For example, the cryptocurrency transactions may be validated using the BITCOIN® network. Some additional details of the BITCOIN® network are provided at en.wikipedia.org/wiki/Bitcoin_network#Bitcoin_mining, which is incorporated by reference in its entirety. While the operating environment 100 includes a single miner device 144, in some embodiments, multiple miner devices 144 may be included to perform cryptocurrency transaction validation.

The public server 124 may include a hardware server that includes a processor, memory, and communication capabilities. In the illustrated embodiments, the public server 124 may be coupled to the network 122 to send and receive data and information to and from one or more of the environment components via the network 122. The public server 124 may have stored thereon the append-only ledger 140. Some details of an example of the append-only ledger 140 are described in en.bitcoin.it/wiki/Help:Introduction, which is incorporated herein by reference in its entirety.

In some embodiments, the append-only ledger 140 may be part of the public domain. Accordingly, the append-only ledger 140 may be stored, accessed, and updated by one or more of the environmental components in the operating environment 100. For instance, the miner device 144 may add a transaction block to the append-only ledger 140. Additionally or alternatively, the CA server 106 and/or the delegated entity server 128 may access the append-only ledger 140 to verify whether one or more of the users 112 have participated in a set of events, which may be reflected as transfers of cryptocurrency (e.g., cryptocurrency coins) from the CA server 106 and/or the delegated entity server 128 to the users 112 or the user devices 115.

The users 112 may include any entity, set of entities, one or more devices, or some combination thereof. For instance, in the depicted embodiment, the users 112 may include individuals. The individuals may participate in one or more of the events and enter into cryptocurrency transactions with the CA server 106 and/or the delegated entity server 128 using one of the user devices 115. In other embodiments, the users 112 may include multiple individuals, who may be related. For example, the user 112 may include a group of individuals who all work at the same place and who may all have access to one of the user devices 115. The individuals individually or as a group may participate in the events. Additionally or alternatively, the user 112 may include one or more devices (e.g., vehicles, pieces of equipment, etc.) that may be associated with one or more individuals. For example, the user 112 may include a piece of equipment that each of a set of individuals uses in the participation of one or more of the events.

The users 112 may be associated with the user devices 115. As used in this disclosure, the term associated with may indicate that the user 112 owns or regularly operates the user device 115.

The user devices 115 may include any computing system that includes a processor, memory, and computing capabilities. In the illustrated embodiments, the user devices 115 may be coupled to the network 122 to send and receive information to and from one or more environment components via the network 122. Some examples of the user devices 115 may include a smart phone, a desktop computer, and the like.

The user devices 115 may include device modules 110. The device modules 110 or some portion therein may be downloaded from the CA server 106 and/or the delegated entity server 128 via the network 122. For instance, in some embodiments, the user devices 115 may communicate a request inclusion in a verification service from the CA server 106 and/or the delegated entity server 128. In response, the CA server 106 and/or the delegated entity server 128 may enable the user devices 115 to download a verification application. In addition, in response to the request, the CA server 106 and/or the delegated entity server 128 may communicate one or more public keys to the user devices 115. The public keys may be assigned to the users 112 and/or the user devices 115.

The verification application may include a mobile application. The verification application may be configured to communicate with the CA server 106 and/or the delegated entity server 128. For example, the verification application may be configured to communicate coin requests to the CA server 106 and/or the delegated entity server 128. The coin requests may include the public key assigned to the user 112, a particular coin set, and a data set that may be used to substantiate participation by the user 112 in one or more of the events.

Additionally, the verification application may be configured to communicate a completion request to the CA server 106 and/or the delegated entity server 128. The completion request may be configured to assert that the user 112 has been transferred a cryptocurrency coin from each of multiple sets of cryptocurrency coins (coin sets), which may represent participation in the set of events. The verification application may also receive notifications. The notifications may include a notification that a cryptocurrency transaction is conducted between the CA server 106 and/or the delegated entity server 128 and the user devices 115.

The device module 110 may be implemented using hardware including a processor, a microprocessor (e.g., to perform or control performance of one or more operations), a field-programmable gate array (FPGA), or an application-specific integrated circuit (ASIC). In some other instances, the device module 110 may be implemented using a combination of hardware and software. Implementation in software may include rapid activation and deactivation of one or more transistors or transistor elements such as may be included in the hardware of a computing system (e.g., the user device 115). Additionally, software defined instructions may operate on information within transistor elements. Implementation of software instructions may at least temporarily reconfigure electronic pathways and transform computing hardware.

The CA entity 150 may be associated with the CA server 106. The delegated entity 152 may be associated with the delegated entity server 128. The CA entity 150 and the delegated entity 152 may include any entity such as a business entity, a governmental entity, and the like. An example of the CA entity 150 may include a business entity interested in directing the users 112 to multiple booths in a conference. An example of the delegated entity 152 may include a governmental body that is interested in directing the users 112 to multiple geographic locations.

The CA server 106 may include a server verification module 108. The server verification module 108 may be configured to set up the cryptocurrency, to verify participation by the users 112, to enter into cryptocurrency transactions, and to verify completion of a set of cryptocurrency transactions. In some embodiments, the server verification module 108 may communicate or enable access to a reward in exchange for participation in the set of events.

For example, the server verification module 108 may generate a master secret key and a master public key. A number of master secret keys and master public keys may be related to a number of coin sets. For instance, the server verification module 108 may generate the master secret key and the master public key for each of the coin sets.

The server verification module 108 may generate a first number of coin sets. One or more of the coin sets may have a second number of cryptocurrency coins. One or more of the coin sets may correlate to one event in the set of events for which participation is to be verified. The master secret key and/or the master public key may be used in coin creation.

The server verification module 108 may generate a user key pair. One or more of the user keys may include a unique public key and a user secret key. For instance, the user keys may include one unique public key for each of the users 112. The second number, which may be the number of coins in the coin sets, may be equal to the number of users 112. For example, there may be five sets of cryptocurrency coin, which may correlate to five events for which verification is to occur. The operating environment 100 may include two users 112. Accordingly each of the coin sets may include two cryptocurrency coins.

In embodiments in which the delegated entity 152 is involved, one or more of the coin sets, the master secret key, the master public key, the user key pair, or some combination thereof may be communicated to the delegated entity server 128 from the CA server 106. For instance, one of the coin sets, an associated master public key, an associated master secret key, and some portion of the set of unique public keys may be communicated to the DE verification module 130 of the delegated entity server 128.

After the DE verification module 130 receives some combination of the coin sets, the master public keys, the master secret keys, or the user key pair, the DE verification module 130 may be configured to perform at least some portion of the participation verification as described in this disclosure. For example, the DE verification module 130 may perform the secure event participation verification with respect to a subset of events, with respect to a subset of users 112, etc.

Accordingly, in embodiments in which the delegated entity 152 is involved, the DE verification module 130 may perform some portion of the participation verification and the server verification module 108 may perform a remaining portion of the participation verification. In embodiments in which the delegated entity 152 is not involved, the server verification module 108 may perform the participation verification.

The participation verification performed by the DE verification module 130 and the server verification module 108 may be similar or the same. For example, as mentioned above, the user 112 may communicate a request to the CA server 106 and/or the delegated entity server 128 requesting inclusion in a verification service. In response to the request, the server verification module 108 or the DE verification module 130 may assign the unique public keys to the user 112 and/or to the user device 115 that is associated with the user 112 who communicated the request. The server verification module 108 or the DE verification module 130 may communicate the assigned unique public key to the user device 115.

The server verification module 108 or the DE verification module 130 may prevent access to the user secret keys paired with the assigned unique public key. Preventing access to the user secret keys limits or prevents the users 112 from entering into cryptocurrency transactions that do not include the CA server 106 or the DE server 128. In addition, in response to the request, the server verification module 108 or the DE verification module 130 may enable downloading of the verification application to the user device 115.

The server verification module 108 or the DE verification module 130 may also receive the coin request from the user device 115. In response to the coin request, the server verification module 108 or the DE verification module 130 may verify that the user 112 participated in one of the events based on the data set included in the coin request.

In some embodiments, in response to the coin request, the server verification module 108 or the DE verification module 130 may also verify that the user 112 has not already received one of the cryptocurrency coins of the identified coin set using the append-only ledger 140. Additionally or alternatively, in response to the coin request the server verification module 108 or the DE verification module 130 may authenticate that a particular user of the users 112 is in control of the user device 115 that submitted the coin request. For example, a challenge may be communicated to the user device 115. The challenge may be configured to verify that the user 112 is in control of the user device 115. For instance, the challenge may require the user 112 to enter in a password or key code. Additionally or alternatively, the challenge may request biometric authentication input to verify that the user 112 is in control of the user device 115. Examples of the biometric authentication input may include a fingerprint, a retinal scan, and the like.

In response to verification of participation in the event by the user 112, the server verification module 108 or the DE verification module 130 may execute a cryptocurrency transaction with the user device 115. As described above, the cryptocurrency transaction may include public validation of transfer of a cryptocurrency coin from the coin set identified in the coin request to the user device 115 via the append-only ledger 140. The cryptocurrency transaction with the user device 115 may be recorded in the append-only ledger 140.

The server verification module 108 or the DE verification module 130 may receive from the user device 115 the completion request. The completion request may be configured to assert that the user 112 has been transferred a cryptocurrency coin from each of the coin sets. In response to the completion requests, the server verification module 108 or the DE verification module 130 may verify that the user 112 has been transferred one of the cryptocurrency coins from each of the coin sets using the append-only ledger 140. Additionally, in some embodiments, in response to verification that the user has been transferred one of the cryptocurrency coins from each of the coin sets, the server verification module 108 or the DE verification module 130 may communicate or enable access to a reward to the user device 115 of the user 112.

The server verification module 108 or the DE verification module 130 may be implemented using hardware including a processor, a microprocessor (e.g., to perform or control performance of one or more operations), an FPGA, or an ASIC. In some other instances, the server verification module 108 or the DE verification module 130 may be implemented using a combination of hardware and software. Implementation in software may include rapid activation and deactivation of one or more transistors or transistor elements such as may be included in the hardware of a computing system (e.g., the CA server 106 or the DE server 128). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. The present disclosure may apply to operating environments that may include one or more CA entities 150, one or more delegated entities 152, one or more CA servers 106, one or more user devices 115, one or more users 112, one or more delegated entity servers 128, one or more miner devices 144, one or more public servers 124, one or more networks 122, or any combination thereof. For example, the operating environment 100 may include miner devices 144 that validate transactions.

Moreover, the separation of various components in the embodiments described herein is not meant to indicate that the separation occurs in all embodiments. It may be understood with the benefit of this disclosure that the described components may be integrated together in a single component or separated into multiple components. For example, the miner device 144 and the public server 124 may be a single computing system.

Figure 2A:
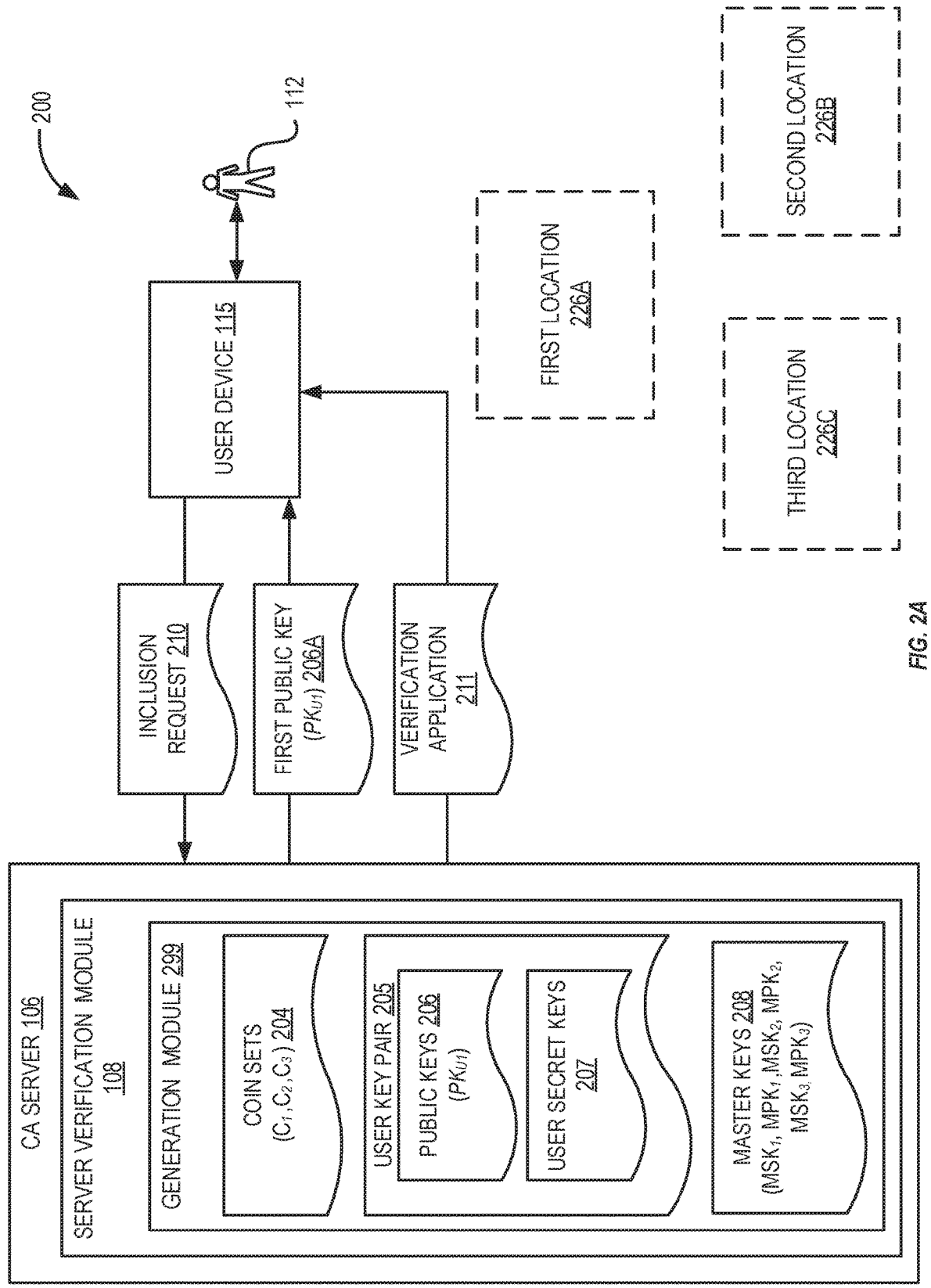
FIG. 2A is a block diagram of a first portion of an example participation verification process that may be implemented in the operating environment of FIG. 1.
Figure 2B:
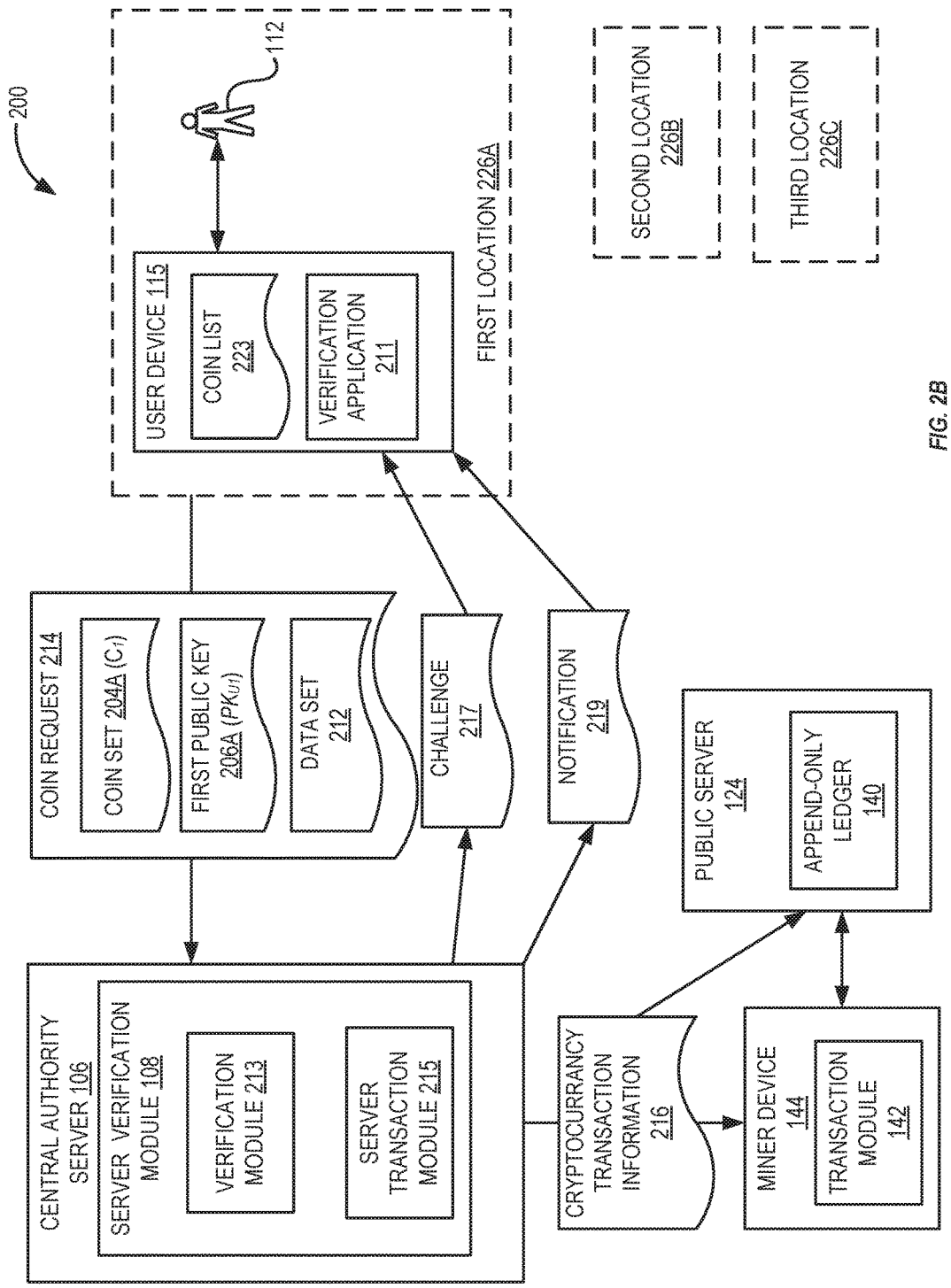
FIG. 2B is a block diagram of a second portion of the participation verification process of FIG. 2A.
Figure 2C:
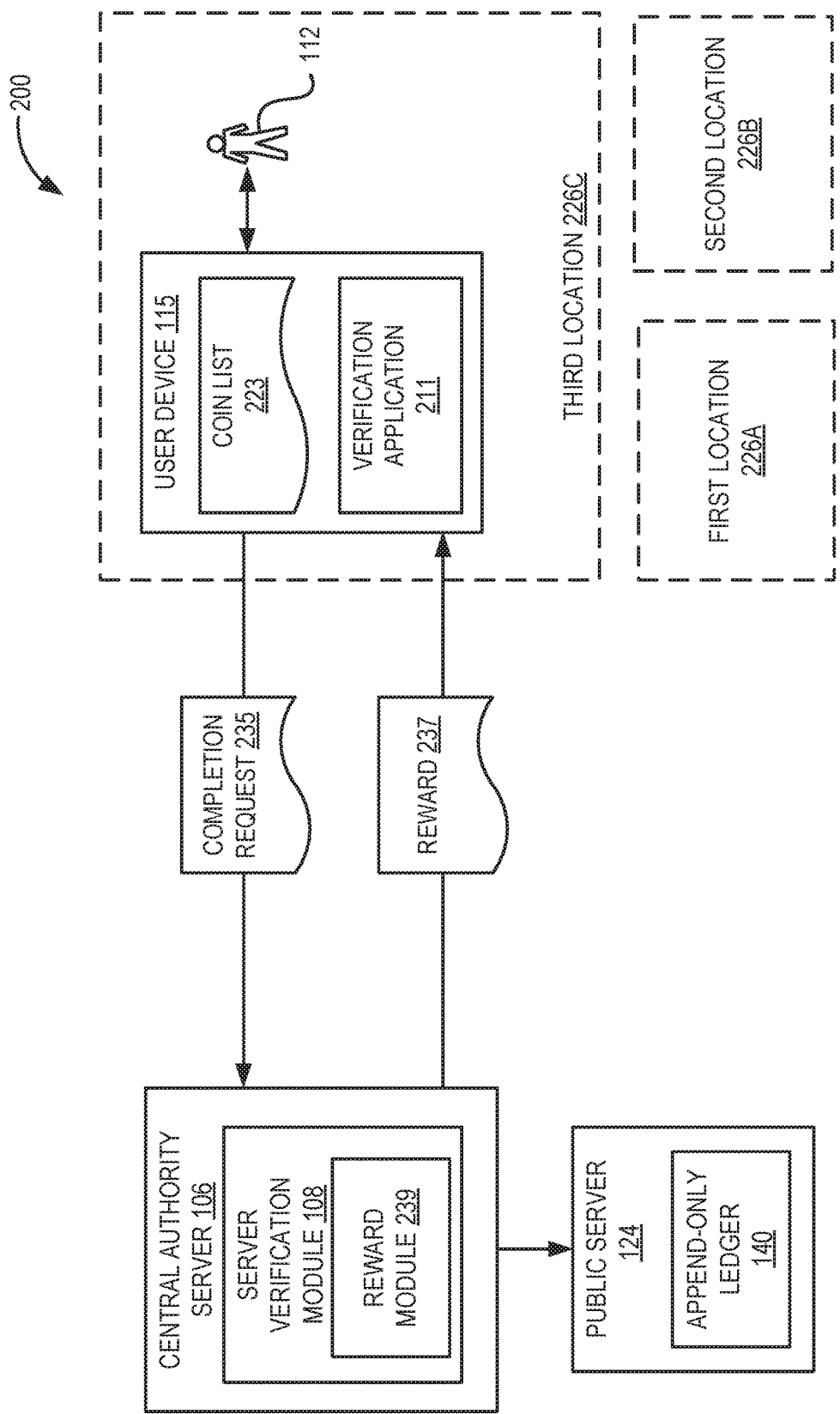
FIG. 2C is a block diagram of a third portion of the participation verification process of FIG. 2A.

FIGS. 2A-2C depict an example participation verification process 200 that may be implemented in the operating environment 100. The participation verification process 200 may be implemented to verify that the users 112 have visited multiple locations 226A-226C (generally, location 226 or locations 226). In the example of FIGS. 2A-2C, visiting the locations 226 are the set of events described with reference to FIG. 1. In the example of FIGS. 2A-2C, each of the locations 226 may be a different geographic location. For example, the CA server 106 may be interested in the users 112 visiting each of the locations 226. In other embodiments, the participation verification process 200 may be implemented to verify participation in another set of events. Indeed, the participation verification process 200 may be implemented in any scenario that involves proving that some set of events have been completed or acquired. For example, the set of events may include proof that the users 112 have viewed a document or proof that a delivery person has delivered a set of items properly, etc.

In FIGS. 2A-2C, the CA server 106 is performing the participation verification process 200. As described above, the DE server 128 of FIG. 1 may perform one or more portions of the participation verification process 200.

FIG. 2A depicts a first portion of the participation verification process 200. In the first portion, a generation module 299 of the server verification module 108 may generate coin sets 204, a user key pair 205, and master keys 208.

The master keys 208 may include a master secret key and a master public key for each of the coin sets 204. For example, in the master keys 208 of FIG. 2A there are a master public key (e.g., $MPK_1$, $MPK_2$, and $MPK_3$) and a master secret key (e.g., $MSK_1$, $MSK_2$, and $MSK_3$) for each of the coin sets 204. The master keys 208 may be generated concurrently or substantially concurrently with the coin sets 204.

The generation module 299 may generate a particular number of the coin sets 204. The generation of the coin sets 204 may be based on the master keys 208. The particular number of coin sets 204 may correspond and/or may be equivalent to a number of the locations 226. For example, in FIG. 2A, the coin sets 204 include "$C_1$, $C_2$, and $C_3$" that correspond to a first location 226A, a second location 226B, and a third location 226C. The coin sets 204 may each include another particular number of coins. The other particular number of coins may correspond and/or may be equivalent to a number of users 112. The CA server 106 may give itself ownership of all the coins in all the coin sets 204.

The user key pair 205 may include public keys 206 and user secret keys 207. The user key pair 205 may be generated using any key generation process that may result in key pairs that include the public keys 206 and the user secret keys 207. The public keys 206 may include a unique public key for each of the users 112. For example in FIG. 2A, the public keys 206 may include $PK_{U_1}$ that may be a unique public key for the user 112.

The server verification module 108 may receive an inclusion request 210 from the user device 115. In response to the inclusion request 210, the server verification module 108 may communicate the unique first public key 206A to the user device 115. The server verification module 108 may also enable download of a verification application 211.

In some embodiments, the public keys 206 may be generated and assigned to the user 112 in response to an inclusion request 210. Accordingly, the generation and assignment of the public keys 206 may be 'on-the-fly,' which may reduce possible loss of forward secrecy that may occur with pre-generation of the public keys 206.

FIG. 2B depicts a second portion of the participation verification process 200. In the second portion, the user 112 may be visiting the first location 226A and may be in control of the user device 115. When prompted by the user 112 or automatically, the verification application 211 may communicate a coin request 214 to the CA server 106. The coin request 214 may include an identified coin set 204A, the first public key 206A of the user 112, and a data set 212. In FIG. 2B, the identified coin set 204A is depicted as first coin set $C_1$ which may indicate that the coin request 214 includes an identification of a first coin set 204A that may correlate to the first location 226A. The first public key 206A may be the unique public key assigned to the user 112 and/or the user device 115. The data set 212 may include information and data configured to prove that the user 112 and/or the user device 115 are visiting the first location 226A. For instance, the first data set 212 may include one or more or a combination of a (global positioning system) GPS signal, a quick response (QR) code, and a local wireless location data.

In embodiments in which the set of events includes another set or series of events, the data set 212 may include different information. For example, in embodiments in which the set of events include proof that users 112 viewed a document, the data set 212 may include a digital signature on the document and/or modified metadata associated with the document. In embodiments in which the set of events include proof that the user delivered items, the data set 212 may include signatures of recipients of the items.

A verification module 213 may receive the coin request 214 and verify that the user 112 participated in the first event (e.g., visited the first location 226A) based on the data set 212. For example, the verification module 213 may correlate the data set 212 to a list of coordinates of the locations 226. In some embodiments, the verification module 213 may verify that the user 112 has not already received one of the cryptocurrency coins of the identified coin set 204A using the append-only ledger 140. For example, the verification module 213 may access the append-only ledger 140. The verification module 213 may then review the append-only ledger 140 to determine whether the CA server 106 has already transferred a cryptocurrency coin of the identified coin set 204A to the user 112 or the user device 115.

In addition, the verification module 213 may authenticate that the user 112 is in control of the user device 115 at the time the coin request 214 is communicated to the CA server 106. For example, the verification module 213 may communicate to the user device 115 a challenge 217 configured to verify that the user 112 is in control of the user device 115. For instance the challenge 217 may request biometric authentication input to verify that the user 112 is in control of the user device 115 or may request the user 112 enters a password into the user device 115.

Additionally, in response to verification of participation in the first event (e.g., that the user 112 actually visited the first location 226A) by the user 112 (e.g., visiting the first location 226A by the user 112), a server transaction module 215 of the server verification module 108 may execute a cryptocurrency transaction with the user device 115. Execution of the cryptocurrency transaction may include communication of cryptocurrency transaction information 216. The cryptocurrency transaction information 216 may be appended to the append-only ledger 140. The miner device 144 may publically validate the cryptocurrency transaction. The cryptocurrency transaction may include public validation of the transfer of a cryptocurrency coin from the identified coin set 204A to the user device 115 via an append-only ledger 140 using the cryptocurrency transaction information 216.

The cryptocurrency transaction information 216 may include a hash of a number of coins of the identified coin set 204A to transfer to the user 112 and the first public key 206A of the user 112. The hash may be signed using the secret master key $MSK_1$ of the identified coin set 204A. Based on the cryptocurrency transaction information 216, the miner device 144 may use the append-only ledger 140 to publically validate the cryptocurrency transaction between the CA server 106 and the user device 115. Some additional details of public validation of the append-only ledger 140 are provided in en.bitcoin.it/wiki/How_bitcoin_works, which is incorporated herein by reference in its entirety.

After validated by the miner device 144, the cryptocurrency transaction may be recorded to the append-only ledger 140. The CA server 106 may then communicate a notification 219 to the user device 115. The user device 115 may then record that the coin of the coin set 204A has been transferred from the CA server 106 to the user device 115 in a coin list 223.

As the user 112 visits the second location 226B and the third location 226C, the user device 115 may communicate additional coin requests 214 to the CA server 106. The additional coin requests 214 may include the first public key 206A, may identify a coin set 204 that correlates with the second location 226B and the third location 226C. In addition, the additional coin requests 214 may include additional data sets 212 that are configured to substantiate that the user 112 actually visited the second location 226B and the third location 226C. The server verification module 108 may then proceed as described above.

In some embodiments, an anonymization technique may be implemented such that the CA server 106 does not have access to identifying information of the user 112. In some embodiments, the anonymization technique may be implemented in the entire cryptocurrency technique. For instance, zcash or a similar cryptocurrency with cryptography may be implemented and/or a laundry mechanism may be implemented. Additionally or alternatively, the participation verification process 200 may implement software that enables access to online resources anonymously, such as Tor, which is available at the TorProject.org.

FIG. 2C depicts a third portion of the participation verification process 200. In the third portion, the verification application 211 may determine from the coin list 223 that the user 112 has visited each of the locations 226. For example, after the verification application 211 communicates a coin request (e.g., 214 of FIG. 2B) for the third location 226C and receives a notification (e.g., 219 of FIG. 2B) indicating execution of a cryptocurrency transaction for a coin from the third coin set, the verification application 211 may determine that the user 112 has visited each of the locations 226.

The verification application 211 may communicate a completion request 235 to the CA server 106. The completion request 235 may be configured to assert that the user 112 has been transferred a cryptocurrency coin from each of the coin sets (e.g., 204 of FIG. 2A). In response to the completion request 235, a reward module 239 of the server verification module 108 may verify that the user 112 has been transferred one of the cryptocurrency coins from each of the coin sets (e.g., 204 of FIG. 2A) using the append-only ledger 140. For example, the reward module 239 may review the append-only ledger 140 for the transfers from the CA server 106 to the user device 115. The append-only ledger 140 may include each of the transfers, thus review of the append-only ledger 140 results in confirmation that the user 112 has been transferred a cryptocurrency coin from each of the coin sets.

In response to verification that the user 112 has been transferred one of the cryptocurrency coins from each of the coin sets, the reward module 239 may communicate a reward 237 to the user device 115 of the user 112.

With combined reference to FIGS. 2A-2C, during the participation verification process 200, the user 112 may not transfer cryptocurrency coins because the user 112 and the user device 115 lacks the user secret keys 207 corresponding to their unique public keys 206. Additionally, the user 112 may not artificially create or obtain cryptocurrency coins because the CA server 106 takes ownership of the cryptocurrency coins. In addition, the user 112 may not improperly receive the reward 237 because the CA server 106 or any other entity can verify ownership via the append-only ledger 140.

Figure 3:
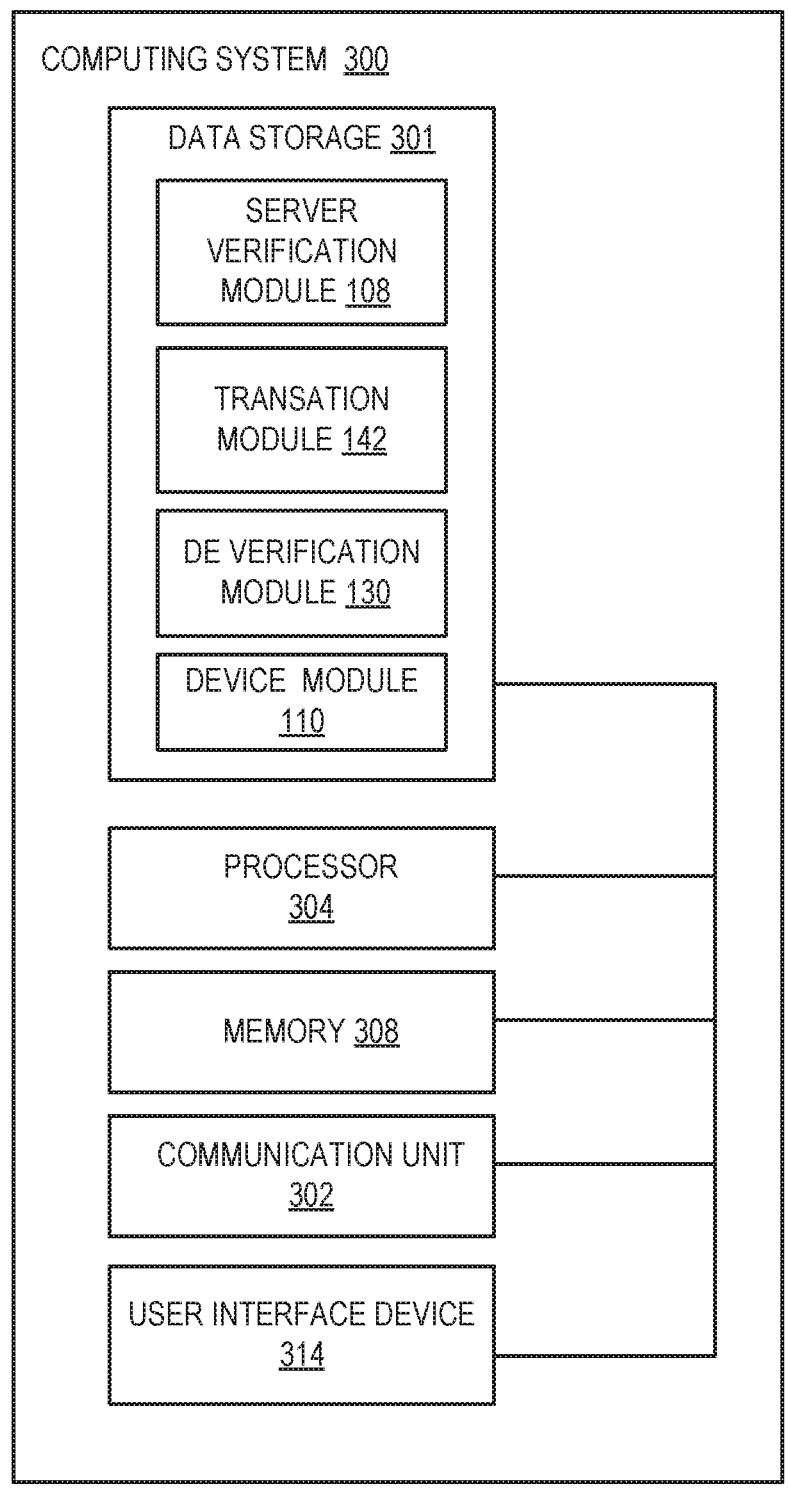
FIG. 3 is a block diagram of a computing system configured for participation verification.

FIG. 3 illustrates an example computing system 300 configured for participation verification. The computing system 300 may be implemented in the operating environment 100 of FIG. 1, for instance. Examples of the computing system 300 may include the public server 124, the user devices 115, the DE server 128, the miner device 144, and the CA server 106. The computing system 300 may include one or more processors 304, a memory 308, a communication unit 302, the user interface device 314, and a data storage 301 that includes the server verification module 108, the transaction module 142, the DE verification module 130, and the device module 110 (collectively, modules 108, 142, 130, and 110).

The processor 304 may include any suitable special-purpose or general-purpose computer, computing entity, or processing device including various computer hardware or software modules and may be configured to execute instructions stored on any applicable computer-readable storage media. For example, the processor 304 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 3, the processor 304 may more generally include any number of processors configured to perform individually or collectively any number of operations described in the present disclosure. Additionally, one or more of the processors 304 may be present on one or more different electronic devices or computing systems. In some embodiments, the processor 304 may interpret and/or execute program instructions and/or process data stored in the memory 308, the data storage 301, or the memory 308 and the data storage 301. In some embodiments, the processor 304 may fetch program instructions from the data storage 301 and load the program instructions in the memory 308. After the program instructions are loaded into the memory 308, the processor 304 may execute the program instructions.

The memory 308 and the data storage 301 may include computer-readable storage media for carrying or having computer-executable instructions or data structures stored thereon. Such computer-readable storage media may include any available media that may be accessed by a general-purpose or special-purpose computer, such as the processor 304. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 304 to perform a certain operation or group of operations.

The communication unit 302 may include one or more pieces of hardware configured to receive and send communications. In some embodiments, the communication unit 302 may include one or more of an antenna, a wired port, and modulation/demodulation hardware, among other communication hardware devices. In particular, the communication unit 302 may be configured to receive a communication from outside the computing system 300 and to present the communication to the processor 304 or to send a communication from the processor 304 to another device or network (e.g., 122 of FIG. 1).

The user interface device 314 may include one or more pieces of hardware configured to receive input from and/or provide output to a user. In some embodiments, the user interface device 304 may include one or more of a speaker, a microphone, a display, a keyboard, a touch screen, or a holographic projection, among other hardware devices.

The modules 108, 142, 130, and 110 may include program instructions stored in the data storage 301. The processor 304 may be configured to load the modules 108, 142, 130, and 110 into the memory 308 and execute the modules 108, 142, 130, and 110. Alternatively, the processor 304 may execute the modules 108, 142, 130, and 110 line-by-line from the data storage 301 without loading them into the memory 308. When executing the modules 108, 142, 130, and 110, the processor 304 may be configured to perform a participation verification process as described elsewhere in this disclosure.

Modifications, additions, or omissions may be made to the computing system 300 without departing from the scope of the present disclosure. For example, in some embodiments, the computing system 300 may not include the user interface device 314. In some embodiments, the different components of the computing system 300 may be physically separate and may be communicatively coupled via any suitable mechanism. For example, the data storage 301 may be part of a storage device that is separate from a server, which includes the processor 304, the memory 308, and the communication unit 302, that is communicatively coupled to the storage device.

Figure 4A:
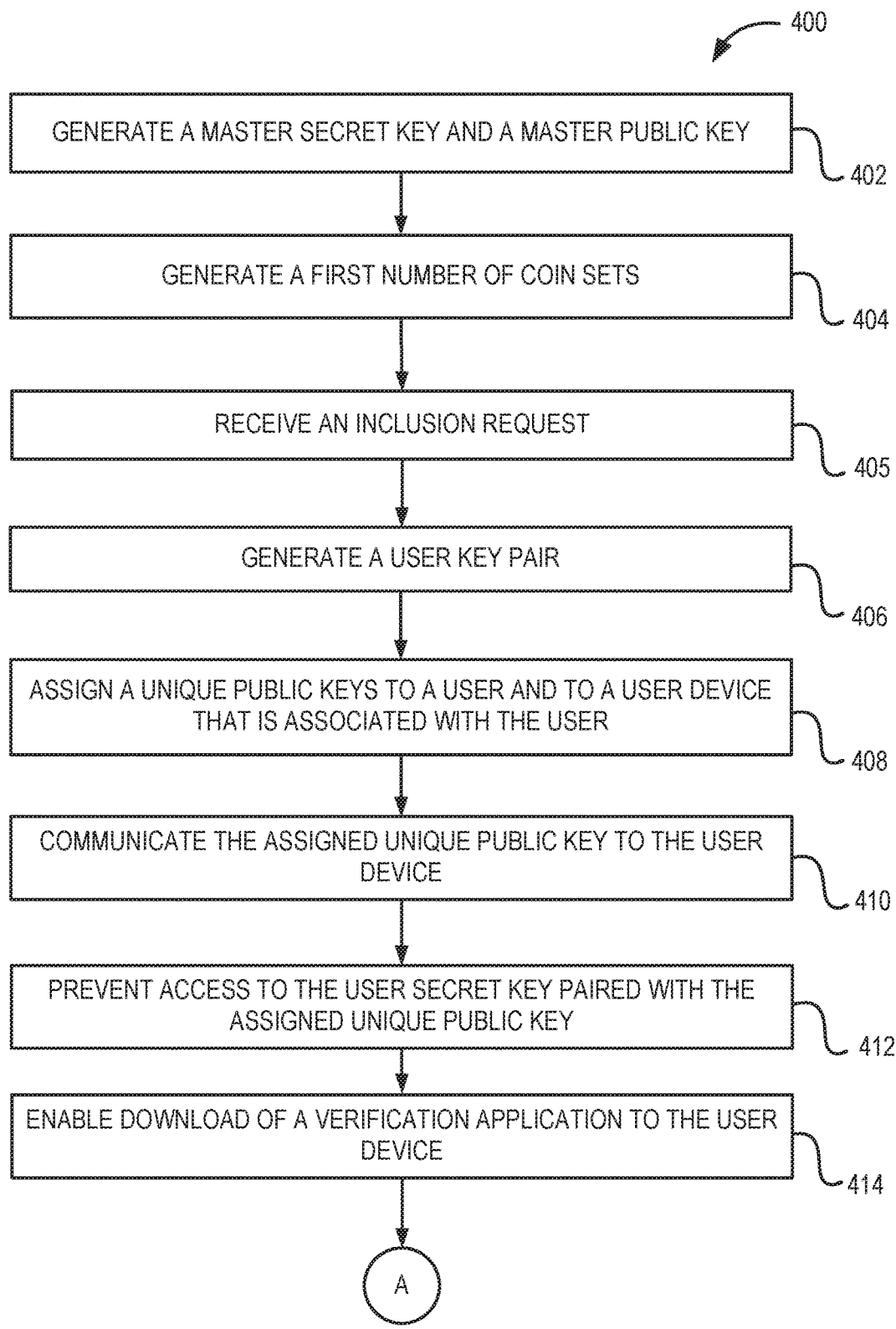
FIGS. 4A-4C are a flow diagram of an example method of event participation verification, all in accordance with at least one embodiment described in this disclosure.
Figure 4B:
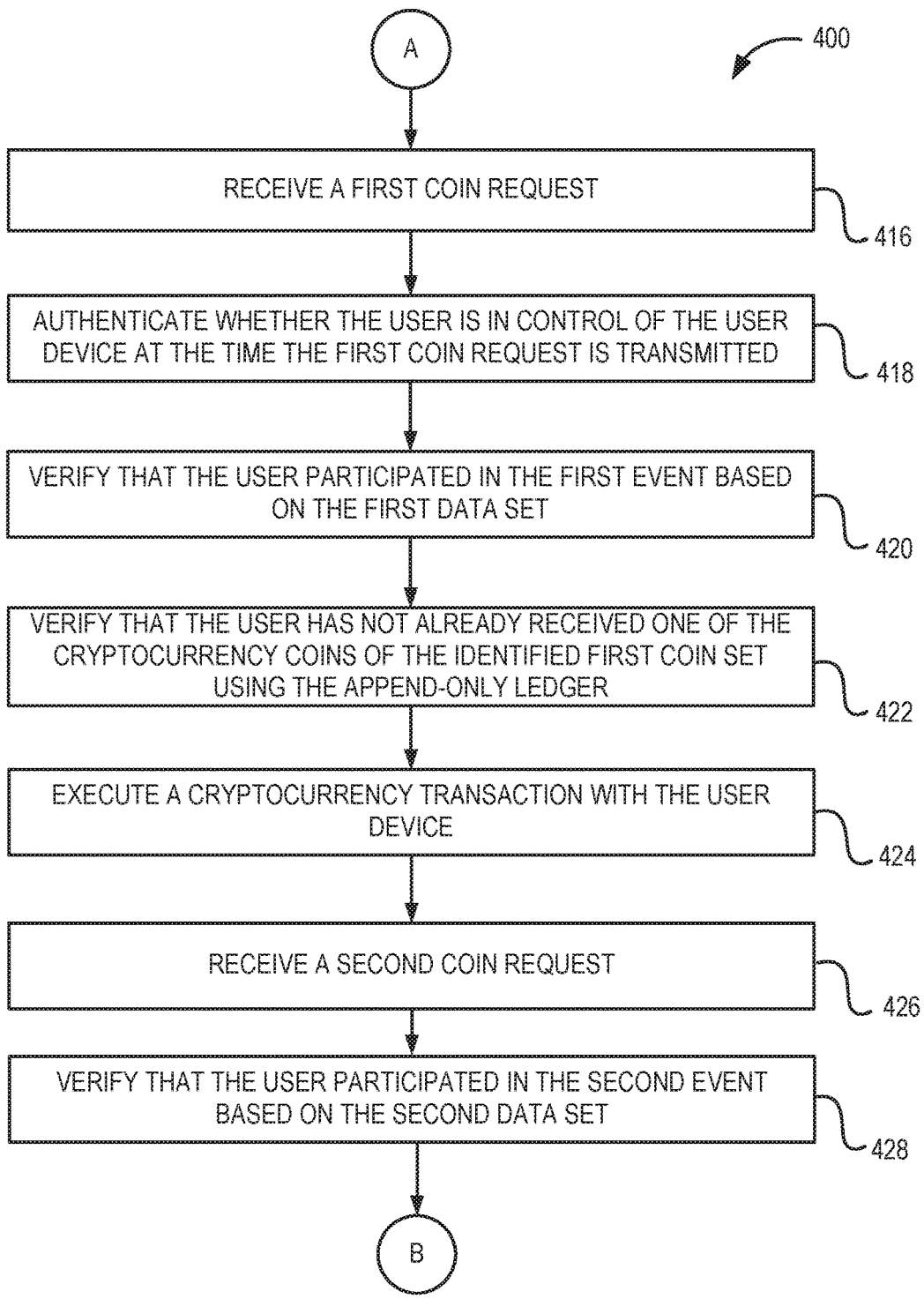
Figure 4C:
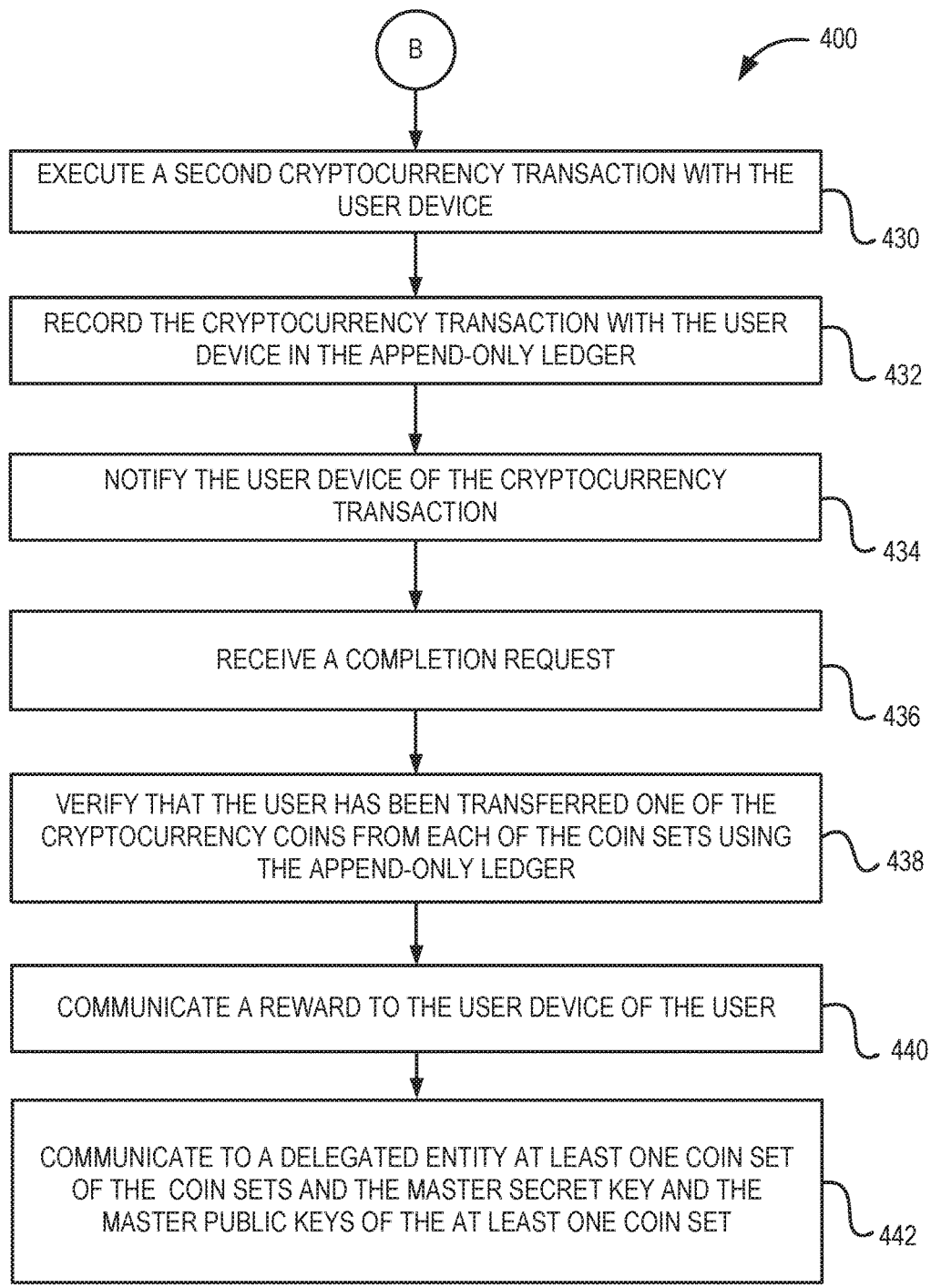

FIGS. 4A-4C are a flowchart of an example method 400 of participation verification. The method 400 may be performed in an operating system such as the operating environment 100 of FIG. 1. The method 400 may be programmably performed in some embodiments by the CA server 106 and/or the DE server 128 described with reference to FIG. 1. In some embodiments, the CA server 106 and/or the DE server 128 or another computing system may include or may be communicatively coupled to a non-transitory computer-readable medium (e.g., the memory 308 of FIG. 3) having stored thereon programming code or instructions that are executable by one or more processors (such as the processor 304 of FIG. 3) to cause a computing system and/or the CA server 106 and/or the DE server 128 to perform or control performance of the method 400. Additionally or alternatively, the CA server 106 and/or the DE server 128 may include the processor 304 described above that is configured to execute computer instructions to cause the CA server 106 and/or the DE server 128 or another computing system to perform or control performance of the method 400. Although illustrated as discrete blocks, various blocks in FIG. 4 may be divided into additional blocks, combined into fewer blocks, or eliminated, depending on the desired implementation.

With reference to FIG. 4A, the method 400 may begin at block 402, in which a master secret key and a master public key may be generated. The master secret key and the master public key may be generated for each coin sets, which are described elsewhere in this disclosure. In some embodiments, the master secret key and the master public key may be generated by a server such as the CA server 106 described with reference to FIG. 1.

At block 404, a first number of coin sets is generated. One or more of the coin sets may include a second number of cryptocurrency coins. Additionally, one or more of the coin sets may be correlated to one event in a set of events for which participation is to be verified. The cryptocurrency coins may be of no monetary value. In some embodiments, the set of events may include visiting a set or series of locations. For instance, the set or series of locations may be booths at a conference and/or diverse geographic locations. The master secret key and a master public key may be used in generation of the coin sets. In some embodiments, the first number of coin sets may be generated by a server such as the CA server 106 described with reference to FIG. 1.

At block 405, an inclusion request may be received. The inclusion request may be received from a user device such as the first user device 115A of FIG. 1. The inclusion request may request information and data to be included in a participation verification service.

At block 406, a user key pair may be generated. The user key pair may include a unique public key and user secret key. The user key pair may include the unique public key for the user associated with the user device from which the inclusion request is sent. In some embodiments, the user key pair may be generated by a server such as the CA server 106 described with reference to FIG. 1.

At block 408, the unique public keys may be assigned to a user and to a user device that is associated with the user. In some embodiments, the set of user keys may be generated and assigned to the user (e.g., block 406 and 408 may be performed) in response to the inclusion request. The generation and assignment may be 'on-the-fly' to reduce possible loss of forward secrecy that may occur with pre-generation of the user keys. In some embodiments, the unique public keys may be assigned by a server such as the CA server 106 described with reference to FIG. 1.

At block 410, the assigned unique public key may be communicated to the user device. For example, in some embodiments, a server such as the CA server 106 of FIG. 1 may communicate the assigned unique public key to a user device such as the first user device 115A via the network 122.

At block 412, access to the user secret key paired with the assigned unique public key may be prevented. Prevention of the access may include storing the user secret key or deleting the user secret key by a server such as the CA server 106 of FIG. 1. By preventing access, transactions between user devices of the cryptocurrency coins may be prevented. At block 414, download of a verification application to the user device may be enabled. For example, in some embodiments, the download of the verification application to the user device such as the first user device 115A may be enabled by a server such as the CA server 106 of FIG. 1. In some embodiments, blocks 408, 410, 412, 414, or some combination thereof may be performed in response to the user of the set of users requesting inclusion in a verification service.

With reference to FIG. 4B, at block 416, a first coin request may be received. The first coin request may be received from the verification application of the user device. The first coin request may include an identification of a first coin set of the coin sets, the unique public key that is assigned to the user, a first data set that is configured to prove participation by the user in a first event that correlates to the first coin set, some other information, or some combination thereof. For example, in some embodiments, a user device such as the first user device 115A may communicate the first coin request to a server such as the CA server 106. The CA server 106 may receive the first coin request.

At block 418, the method may include authenticating whether the user is in control of the user device at the time the first coin request is transmitted. The authenticating may be performed in response to receipt of the first coin request. In some embodiments, the authenticating may include communicating to the user device a challenge configured to verify that the user is in control of the user device in response to receipt of the first coin request. Additionally or alternatively, the authenticating may include requesting biometric authentication input to verify that the user is in control of the user device.

At block 420, user participation in the first event may be verified. The user participation may be verified based on the first data set. In some embodiments, the first data set includes a (global positioning system) GPS signal, a quick response (QR) code, a local wireless location data, or some combination thereof. For instance, the set of events may include the user visiting one or more of a set of locations. The first data set may be GPS coordinates or another of the first data set examples generated by the user device when the user is at one or more of the set of locations. At block 422, it may be verified that the user has not already received one of the cryptocurrency coins of the identified first coin set using an append-only ledger.

At block 424, a cryptocurrency transaction may be executed with the user device. The cryptocurrency transaction may be executed in response to verification of participation in the first event by the user. The cryptocurrency transaction may include public validation of transfer of a cryptocurrency coin from the identified first coin set to the user device via the append-only ledger. The executing the cryptocurrency transaction may involve the master secret key for the identified first coin set and the assigned unique public key.

At block 426, a second coin request may be received from the verification application of the user device. The second coin request may include an identification of a second coin set of the coin sets, the unique public key that is assigned to the user, and a second data set configured to prove participation by the user in a second event that correlates to the second coin set. At block 428, in may be verified that the user participated in the second event based on the second data set.

With reference to FIG. 4C, at block 430, a second cryptocurrency transaction may be executed with the user device. The second cryptocurrency transaction may be executed in response to verification of participation in the second event by the user. The second cryptocurrency transaction may include public validation of transfer of a cryptocurrency coin from the identified second coin set to the user device via the append-only ledger.

At block 432, the cryptocurrency transaction with the user device may be recorded in the append-only ledger. In some embodiments, the recording the cryptocurrency transaction includes logging the master secret key for the identified first coin set and the unique public key assigned to the user as a signature chain in the append-only ledger. At block 434, the user device may be notified of the cryptocurrency transaction. At block 436, a completion request may be received from the user device. The completion request may be configured to assert that the user has been transferred a cryptocurrency coin from each of the coin sets.

At block 438, it may be verified that the user has been transferred one of the cryptocurrency coins from each of the coin sets using the append-only ledger in response to the completion requests. At block 440, a reward may be communicated to the user device of the user in response to verification that the user has been transferred one of the cryptocurrency coins from each of the coin sets.

At block 442, at least one coin set of the coin sets and the master secret key and the master public keys of the at least one coin set may be communicated to a delegated entity. The delegated entity may receive from the verification application of the user device any cryptocurrency coin requests for cryptocurrency coins of the at least one coin set and executes cryptocurrency transactions involving transfer of cryptocurrency coins from the at least one coin set. The delegated entity may perform one or more of the blocks 408, 410, 412, 414, 416, 418, 420, 422, 424, 426, 428, 430, 432, 434, 436, 438, 440, or some combination thereof.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of transacting with cryptocurrency coins, the method comprising:
   generating a respective master key set that includes a respective master secret key and a respective master public key in which the respective master key set is unique to each set of a plurality of sets of cryptocurrency coins (coin sets) each related to a corresponding cryptocurrency;
   generating the plurality of coin sets, each of the coin sets having a number of cryptocurrency coins and each of the coin sets being correlated to one event in a set of events;
   in response to a user of a set of users requesting inclusion in a verification service:
      generating, at a server system, a user key pair that includes a unique public key for the user and a user secret key;
      storing, at the server system, the user secret key;
      assigning the unique public key to the user and to a user device that is associated with the user;
      preventing the user from accessing the user secret key in a manner that prevents the user from executing a cryptocurrency transaction using the user secret key and that limits cryptocurrency transactions performed by the user to transactions that include the server system; and
      communicating the assigned unique public key to the user device;
   receiving from a verification application of the user device, a first coin request for a cryptocurrency coin of a first coin set of the coin sets, a first event correlating to the first coin set, the first coin request including:
      the unique public key that is assigned to the user,
      a first data set that is configured to prove participation by the user in the first event that correlates to the first coin set, and
      an identification of the first coin set of the coin sets;
   in response to the first coin request:
      reviewing an append-only ledger associated with the cryptocurrency to determine that the user has not already received, from the server system, a cryptocurrency coin of the first coin set in association with participation in the first event by the user; and
      verifying that the user participated in the first event based on the first data set;
   in response to verification of participation in the first event by the user and determining that the user has not already received a cryptocurrency coin of the first coin set from the server system, executing, at the server system, a cryptocurrency transaction with the user device, the cryptocurrency transaction including:
      signing, using the respective secret master key of the first coin set, the unique public key assigned to the user and a quantity of cryptocurrency coins of the first coin set to transfer to the user, the signing generating a hash of the quantity of coins of the first coin set to transfer to the user;
      public validation of transfer of the quantity of cryptocurrency coins from the identified first coin set to the user device by a miner device using the append-only ledger to verify the hash signed by the respective master public key of the first coin set; and
      in response to public validation of the transfer, recording the cryptocurrency transaction in the append-only ledger, including logging the unique public key assigned to the user in a signature chain in the append-only ledger;
   receiving from the verification application of the user device, a second coin request for a cryptocurrency coin of a second coin set of the coin sets, a second event correlating to the second coin set, the second coin request including:
      the unique public key that is assigned to the user,
      a second data set that is configured to prove participation by the user in a second event that correlates to the second coin set, and
      an identification of a second coin set of the coin sets; in response to the second coin request:
      reviewing the append-only ledger associated with the cryptocurrency to determine that the user has not already received, from the server system, a cryptocurrency coin of the second coin set in associated with participation in the second event by the user; and
      verifying that the user participated in the second event based on the second data set;
   in response to verification of participation in the second event by the user and determining that the user has not already received a cryptocurrency coin of the second coin set from the server system, executing, at the server system, a second cryptocurrency transaction with the user device, the second cryptocurrency transaction including:
      signing, using the respective secret master key of the second coin set, the unique public key assigned to the user and a quantity of cryptocurrency coins of the second coin set to transfer to the user, the signing generating a hash of the quantity of coins of the second coin set to transfer to the user;
      public validation of transfer of the quantity of cryptocurrency coins from the identified second coin set to the user device by a miner device using the append-only ledger to verify the hash signed by the respective master public key of the second coin set; and
      in response to public validation of the transfer, recording the second cryptocurrency transaction in the append-only ledger, including logging the unique public key assigned to the user in a signature chain in the append-only ledger;

automatically determining, by the verification application, that the user has visited all events in the set of events, the determination based on the user having visited the first event and the second event and the user having received the quantity of cryptocurrency coins from the first coin set and the quantity of cryptocurrency coins from the second coin set;

in response to automatically determining the user has visited all events in the set of events, receiving a completion request, the completion request configured to assert that the user has been transferred the quantity of cryptocurrency coins of the first coin set; and in response to the completion request, verifying that the user has been transferred the quantity of cryptocurrency coins of the first coin set by reviewing the append-only ledger.

2. The method of claim 1, further comprising:

in response to verification that the user has been transferred one of the cryptocurrency coins from each of the coin sets, communicating a reward to the user device of the user.

3. The method of claim 1, further comprising notifying the user device of the cryptocurrency transaction.

4. The method of claim 1, further comprising:

in response to receipt of the first coin request:

communicating to the user device a challenge configured to verify that the user is in control of the user device; or requesting biometric authentication input to verify that the user is in control of the user device.

5. The method of claim 1, wherein the cryptocurrency coins are of no monetary value.

6. The method of claim 1, wherein:

the set of events include visiting a set or series of locations, and the first data set includes one or more or a combination of a (global positioning system) GPS signal, a quick response (QR) code, and a local wireless location data.

7. The method of claim 1, further comprising communicating to a delegated entity at least one coin set of the coin sets and the respective master secret key and the respective master public key of the at least one coin set, wherein the delegated entity receives from the verification application of the user device any cryptocurrency coin requests for cryptocurrency coins of the at least one coin set and executes cryptocurrency transactions involving transfer of cryptocurrency coins from the at least one coin set.

8. A non-transitory computer-readable medium having encoded therein programming code executable by one or more processors to perform or cause a system to perform operations comprising:

generating a respective master key set that includes a respective master secret key and a respective master public key in which the respective master key set is unique to each set of a plurality of sets of cryptocurrency coins (coin sets) each related to a corresponding cryptocurrency;

generating the plurality of coin sets, each of the coin sets having a number of cryptocurrency coins and each of the coin sets being correlated to one event in a set of events;

in response to a user of a set of users requesting inclusion in a verification service:

generating, at a server system, a user key pair that includes a unique public key for the user and a user secret key;

storing, at the server system, the user secret key;

assigning the unique public key to the user and to a user device that is associated with the user;

preventing the user from accessing the user secret key in a manner that prevents the user from executing a cryptocurrency transaction using the user secret key and that limits cryptocurrency transactions performed by the user to transactions that include the server system; and communicating the assigned unique public key to the user device;

receiving from a verification application of the user device, a first coin request for a cryptocurrency coin of a first coin set of the coin sets, a first event correlating to the first coin set, the first coin request including:

the unique public key that is assigned to the user, a first data set that is configured to prove participation by the user in the first event that correlates to the first coin set, and an identification of the first coin set of the coin sets;

in response to the first coin request:

reviewing an append-only ledger associated with the cryptocurrency to determine that the user has not already received, from the server system, a cryptocurrency coin of the first coin set in association with participation in the first event by the user; and verifying that the user participated in the first event based on the first data set; in response to verification of participation in the first event by the user, and determining that the user has not already received a cryptocurrency coin of the first coin set from the server system, executing, at the server system, a cryptocurrency transaction with the user device, the cryptocurrency transaction including:

signing, using the respective secret master key of the first coin set, the unique public key assigned to the user and a quantity of cryptocurrency coins of the first coin set to transfer to the user, the signing generating a hash of the quantity of coins of the first coin set to transfer to the user;

public validation of transfer of the quantity of cryptocurrency coins from the identified first coin set to the user device by a miner device using the append-only ledger to verify the hash signed by the respective master public key of the first coin set; and in response to public validation of the transfer, recording the cryptocurrency transaction in the append-only ledger, including logging the unique public key assigned to the user in a signature chain in the append-only ledger;

receiving from the verification application of the user device, a second coin request for a cryptocurrency coin of a second coin set of the coin sets, a second event correlating to the second coin set, the second coin request including:

the unique public key that is assigned to the user, a second data set that is configured to prove participation by the user in a second event that correlates to the second coin set, and an identification of a second coin set of the coin sets; in response to the second coin request:
  reviewing the append-only ledger associated with the cryptocurrency to determine that the user has not already received, from the server system, a cryptocurrency coin of the second coin set in associated with participation in the second event by the user; and
  verifying that the user participated in the second event based on the second data set;
in response to verification of participation in the second event by the user and determining that the user has not already received a cryptocurrency coin of the second coin set from the server system, executing, at the server system, a second cryptocurrency transaction with the user device, the second cryptocurrency transaction including:
signing, using the respective secret master key of the second coin set, the unique public key assigned to the user and a quantity of cryptocurrency coins of the second coin set to transfer to the user, the signing generating a hash of the quantity of coins of the second coin set to transfer to the user;
public validation of transfer of the quantity of cryptocurrency coins from the identified second coin set to the user device by a miner device using the append-only ledger to verify the hash signed by the respective master public key of the second coin set; and
in response to public validation of the transfer, recording the second cryptocurrency transaction in the append-only ledger, including logging the unique public key assigned to the user in a signature chain in the append-only ledger;
automatically determining, by the verification application, that the user has visited all events in the set of events, the determination based on the user having visited the first event and the second event and the user having received the quantity of cryptocurrency coins from the first coin set and the quantity of cryptocurrency coins from the second coin set;
in response to automatically determining the user has visited all events in the set of events, receiving a completion request, the completion request configured to assert that the user has been transferred the quantity of cryptocurrency coins of the first coin set; and
in response to the completion request, verifying that the user has been transferred the quantity of cryptocurrency coins of the first coin set by reviewing the append-only ledger.

9. The non-transitory computer-readable medium of claim 8, wherein the operations further comprise:
  in response to verification that the user has been transferred one of the cryptocurrency coins from each of the coin sets, communicating a reward to the user device of the user.

10. The non-transitory computer-readable medium of claim 8, wherein the operations further comprise notifying the user device of the cryptocurrency transaction.

11. The non-transitory computer-readable medium of claim 8, wherein the operations further comprise in response to receipt of the first coin request:
  communicating to the user device a challenge configured to verify that the user is in control of the user device; or
  requesting biometric authentication input to verify that the user is in control of the user device.

12. The non-transitory computer-readable medium of claim 8, wherein the cryptocurrency coins are of no monetary value.

13. The non-transitory computer-readable medium of claim 8, wherein:
  the set of events include visiting a set or series of locations, and
  the first data set includes one or more or a combination of a (global positioning system) GPS signal, a quick response (QR) code, and a local wireless location data.

14. The non-transitory computer-readable medium of claim 8, wherein the operations further comprise communicating to a delegated entity at least one coin set of the coin sets and the respective master secret key and the respective master public key of the at least one coin set, wherein the delegated entity receives from the verification application of the user device any cryptocurrency coin requests for cryptocurrency coins of the at least one coin set and executes cryptocurrency transactions involving transfer of cryptocurrency coins from the at least one coin set.

* * * * *